United States Patent [19]
Caudle et al.

[11] Patent Number: 5,392,807
[45] Date of Patent: Feb. 28, 1995

[54] FLUID PRESSURE ACTUATED FLOW CONTROL VALVE

[75] Inventors: Norman E. Caudle, Dakota; Guy A. Jang, Loves Park; Ronald A. Johnsen, Rockford, all of Ill.

[73] Assignee: AquaMatic, Inc., Rockford, Ill.

[21] Appl. No.: 185,194

[22] Filed: Jan. 24, 1994

Related U.S. Application Data

[62] Division of Ser. No. 18,506, Feb. 17, 1993.

[51] Int. Cl.⁶ ............... F16K 51/00; F01B 29/00; F01B 31/00
[52] U.S. Cl. .................. 137/316; 251/61.5; 92/98 R; 92/128; 92/133
[58] Field of Search ............ 137/315, 316, 523; 251/61.2, 61.3, 61.4, 61.5, 82, 83; 92/98, 99, 100, 128, 133

[56] References Cited

U.S. PATENT DOCUMENTS

| | | | |
|---|---|---|---|
| 2,625,954 | 1/1953 | Klein | 92/133 X |
| 3,026,081 | 3/1962 | Rossi | 92/133 X |
| 3,115,068 | 12/1963 | Lofink | 92/100 X |
| 3,960,358 | 6/1976 | Vollmer et al. | 251/61.5 |
| 4,239,181 | 12/1980 | Brakebill | 251/61.5 |
| 4,469,016 | 9/1984 | Butler et al. | 92/128 |
| 4,702,150 | 10/1987 | Kaji | 92/128 |

Primary Examiner—John Rivell
Attorney, Agent, or Firm—Vernon J. Pillote

[57] ABSTRACT

A valve of the type in which a movable valve member is spring loaded to a normally closed position and operated to an open position by a fluid pressure responsive actuator and wherein the valve closing spring and pressure responsive actuator are enclosed in a removable actuator casing. A spring compressing mechanism is provided which is adjustable to a first condition in which a valve closing spring and pressure responsive actuator are allowed to operate the valve member in the normal fashion and to a second condition in which the spring is compressed sufficient to relieve closing pressure on the valve member and enable safe disassembly of the actuator casing and spring.

13 Claims, 4 Drawing Sheets

FLUID PRESSURE ACTUATED FLOW CONTROL VALVE

This application is a division of application Ser. No. 08/081,506, filed Feb. 17, 1993, now pending.

BACKGROUND OF THE INVENTION

Fluid pressure actuated flow control valves commonly include a fluid pressure responsive valve actuator enclosed in a housing having an actuator base and an actuator cap removably attached to the base by a plurality of fasteners. In normally closed valves, one or more valve closing springs are interposed between the actuator cap and the pressure responsive actuator to normally urge the valve member to a closed position. The valve closing spring or springs, especially in valves for use in large flow lines and/or high pressure systems, are under high compression or pre-load when the valve member is closed and the reaction force of the valve closing springs acts on the cap and the fasteners that connect the cap to the base. Removal of the cap fasteners for disassembly of the actuator cap from the base under these conditions can cause personal injury or damage to the valve or both. In prior valves of this type, it was necessary to use a clamp fixture or press to hold the actuator cap in assembled condition on the actuator base during removal of the cap fasteners, and then operate the press to gradually release the spring compression. Such valves are difficult to repair in the field and generally require disconnection and removal of the valve from the piping system.

SUMMARY OF THE INVENTION

It is an object of the present invention to overcome the disadvantages of the prior art by providing a normally closed pressure actuated flow control valve which can be adjusted from externally of the valve to relieve the spring reaction force on the cap fastening means and thereby facilitate detachment and removment of the actuator cap from the actuator base.

Another object of this invention is to provide a fluid pressure actuated flow control valve having an improved actuator construction which facilitates assembly and disassembly of the actuator and which provides uniform distribution of forces between the actuator parts.

In accordance with one aspect of the present invention, there is provided a flow control valve having a fluid pressure responsive actuator means, valve closing spring means disposed in the actuator cap with a first spring abutment means at a first end of the spring for spring-loading the pressure responsive actuator means toward a valve closed position, a second spring abutment means engaging a second end of the spring means for transmitting the spring reaction force to the actuator cap, and spring adjustment means operable from outside the cap for adjusting the axial spacing between the first and second spring abutment means (a) to an actuator unload spacing between the first and second spring abutment means in which there is no spring loading on the actuator means when the valve member is in the closed position, to thereby facilitate assembly and disassembly of the cap from the base; and (b) to an actuator pre-load spacing between the first and second spring abutment means in which the spring loading on the actuator means when the valve member is closed is sufficient to hold the valve member seated against fluid pressure at the inlet side of the valve seat. In one embodiment, the spring adjustment means is arranged to compress the spring in the actuator cap and move the first spring abutment means out of engagement with the pressure responsive actuator when the valve member is in its closed position, and the first spring abutment is arranged to disengage and separate from the pressure responsive actuator at the actuator unload spacing to enable removal of the spring and spring adjustment means with the actuator cap. In a second embodiment, the second spring abutment means is movable to an actuator unload spacing in which the second spring abutment is spaced from the first spring abutment means a distance corresponding to the fully expanded free length of the spring.

In accordance with another aspect of the present invention, there is provided a fluid pressure actuated flow control valve having an improved actuator housing comprising an actuator base including an annular base wall spaced outwardly from the valve stem and having external threads and a base end face, an actuator cap including an annular cap wall means spaced outwardly from the stem and having a cap end face, an annular stationary actuator wall means having outwardly extending flange means disposed between the base end face and the cap end face, and an annular clamp ring threadedly engaging the external threads on the base wall and extending around the annular flange means and having an inwardly directed flange portion engaging the cap for clamping the cap to the base.

DETAILED DESCRIPTION

Figure 1:
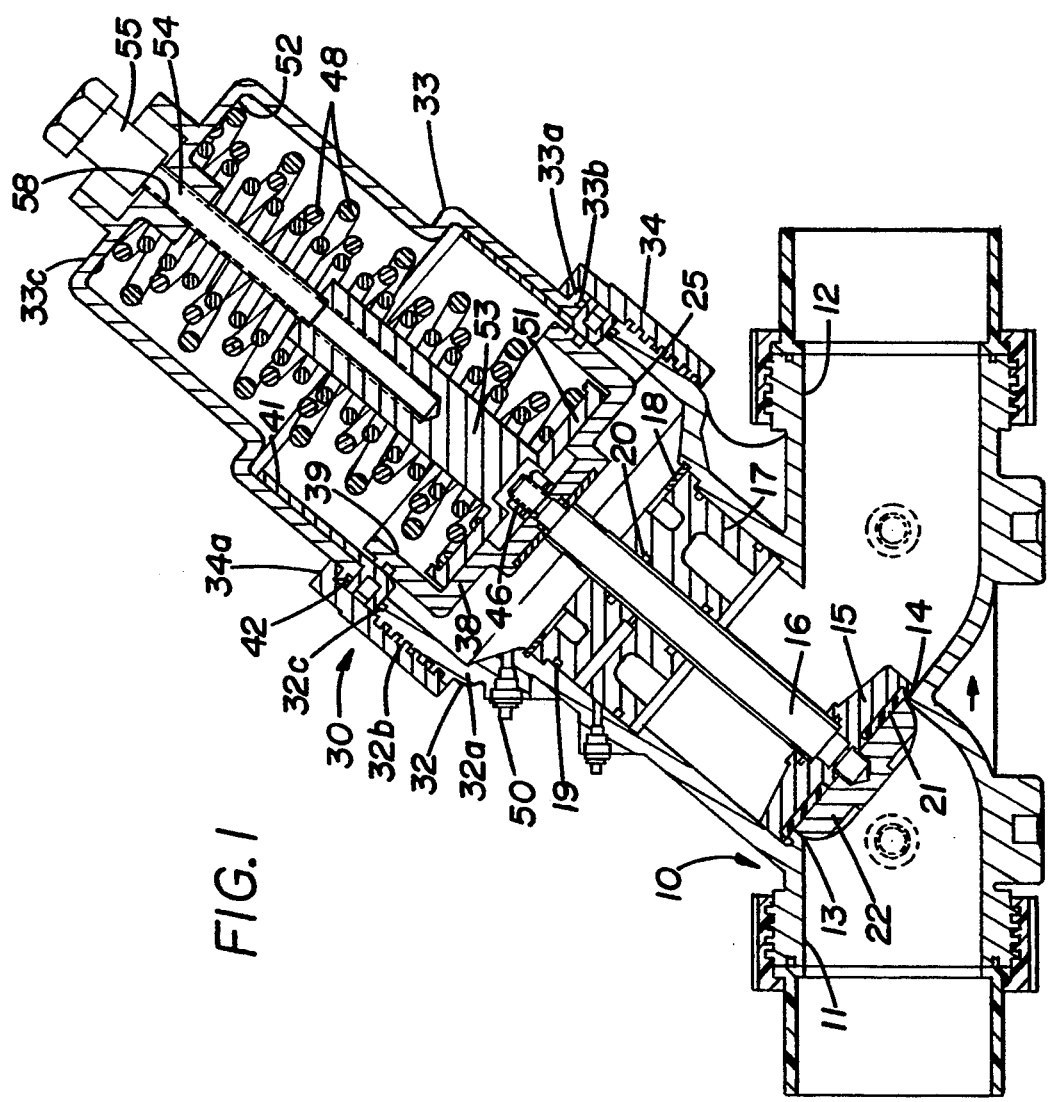
FIG. 1 is a sectional view through a flow control valve with a piston type actuator and spring loaded to a normally closed position.

The pressure actuated flow control valve in general includes a valve casing 10 that defines a flow passage having an inlet 11, an outlet 12 and a valve port 13 and valve seat 14 intermediate the inlet and outlet. A valve member 15 is attached to a valve stem 16 that is guidably supported in a stem guide 17 and the stem guide is removably retained in the valve casing as by a split ring 18 and is sealed to the valve casing by resilient seal rings 19. The valve stem 16 is slidably supported in the guide for movement with the valve member toward and away from the valve seat and seal rings 20 provide a sliding seal between the valve guide and valve stem. Valve member 15 has a seat seal 21 of resilient material arranged to engage the valve seat 14 and seal retainer 22 to retain the seat seal on the valve member.

A pressure responsive valve actuator 25 is attached to the valve stem for reciprocation therewith and is disposed in an actuator housing designated generally by the numeral 28. The housing includes an actuator base 32 fixed to the valve casing and an actuator cap 33. The actuator base includes an annular base wall 32a preferably formed integrally with the valve casing and having external threads 32b and a base end face 32c disposed in a plane perpendicular to the valve stem. The actuator cap 33 is open at one end and has an outwardly extending flange 33a at the open end and a cap end face 33b. The actuator cap 33 is detachably secured to the base by a clamp ring 34 having internal threads that threadedly engage the external threads on the annular base wall, and the clamp ring has an inwardly extending flange portion 34a arranged to engage the flange 33a on the cap.

Figure 2:
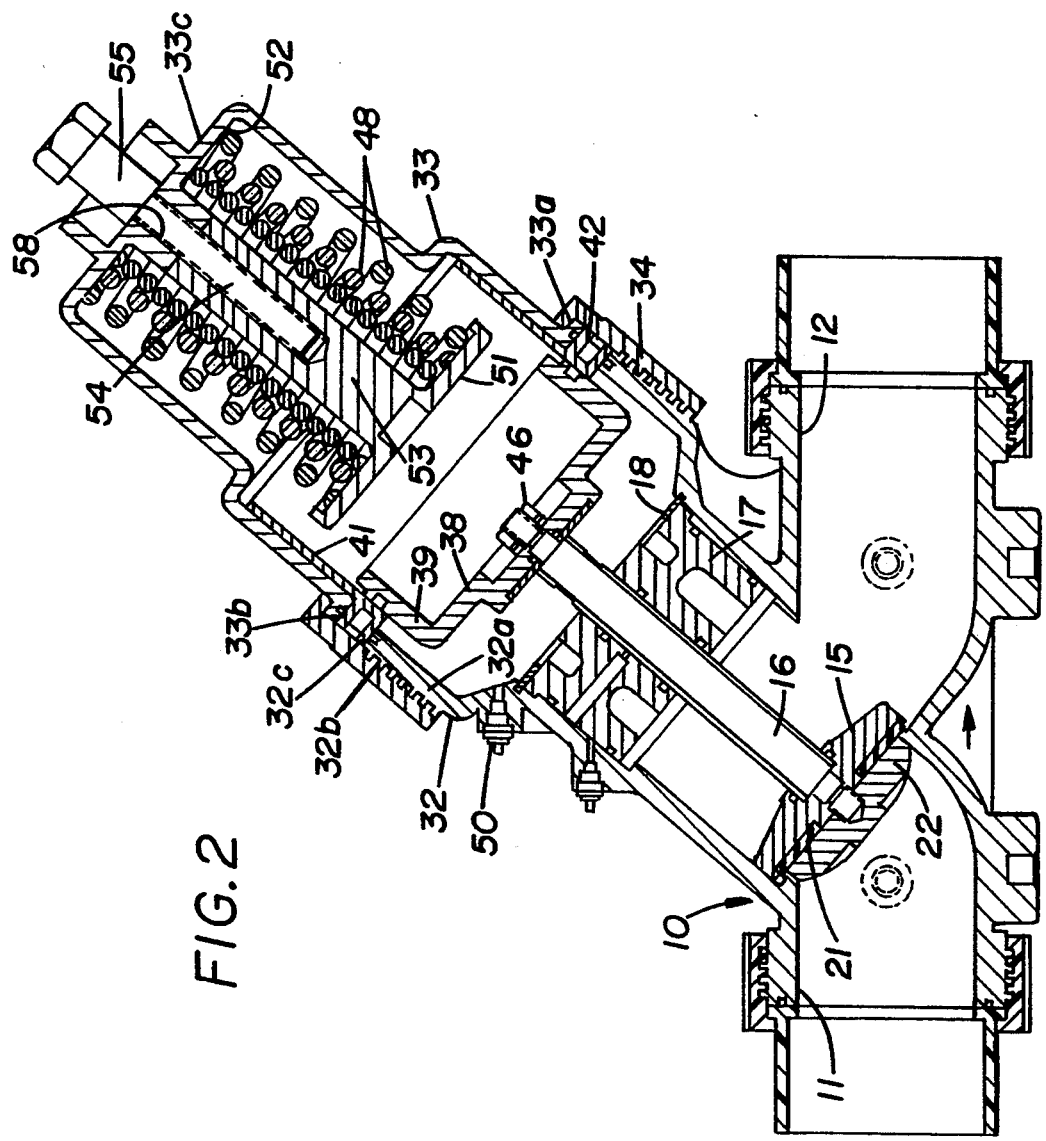
FIG. 2 is a sectional view through the valve of FIG. 1 with the valve closing spring compressed.

In the embodiment of FIGS. 1 and 2, the pressure responsive actuator means 25 is a rigid piston having an end wall 38 and a side wall 39 that is slidably supported in a stationary actuator wall or sleeve 41. The sleeve 41 is preferably formed of wear resistant plastic material and has an outwardly extending flange 42 disposed between the base end face 32c and the cap end face 33b. Seal rings are provided in the base end face and cap end face to seal the base and cap to the flange 42. The piston actuator is attached to the valve stem for reciprocation with the stem and valve member and, as shown, the stem has a reduced diameter end portion defining a shoulder and metal washer engages the shoulder and the underside of the piston end wall. The reduced diameter end of the valve stem extends through an opening in the end wall of the piston and the piston is retained on the stem by a nut and washers 46. Thus, the piston is mounted for reciprocation with the stem and is sealed to the stem as by a resilient ring.

In the embodiment of FIGS. 1 and 2, the valve is normally biased to a closed position by one or more coil type compression springs 48. The coil type compression springs are selected to provide a valve closing force, when compressed to a valve preload condition as shown in FIG. 1, sufficient to hold the valve member closed against the working pressure in the valve casing, and to allow the valve member to move from the closed position to a fully open position allowing substantially full flow through the valve. Thus, when the valve member is closed, the springs 48 are under substantial compression or pre-load and the reaction force of the springs acts on the cap and on the fastening means which holds the cap on the actuator base.

In accordance with one aspect of the present invention, a spring adjustment means operable from outside the cap is provided for selectively adjusting the spring to an actuator unload condition in which there is substantially no spring loading on the actuator when the valve member is in its closed position, to facilitate assembly and disassembly of the cap from the base, to an actuator pre-load condition in which the spring loading of the actuator when the valve is closed is sufficient to hold the valve member seated against the working pressure in the valve. In the embodiment of FIGS. 1 and 2, a first spring abutment or first head member 51 is disposed at a first end of the spring 48 and is movable into and out of engagement with the pressure responsive actuator 25. The actuator cap has an end wall 33c spaced from the actuator base and which provides an inner stationary abutment 52 facing toward the actuator base and which engages the other end of the compression spring 48. The spring adjustment means includes first and second members 53 and 54 threadedly interconnected for axial adjustment, the first member being connected to the first spring abutment means 51 and the second member having outer head means 55 disposed outside the cap for engaging an outer abutment on the end wall 33c of the cap. The first and second threadedly interconnected members are adjustable from an actuator pre-load spacing between the first and second abutments 51 and 52, in which the inner abutment is in engagement with the pressure responsive actuator and the outer head 55 is out of pressure engagement with the outer abutment on the cap as shown in FIG. 1, so that the springs can hold the valve member in its normally closed position against the working pressure in the valve. The threadedly interconnected member 54 extends through an opening 58 in the end wall 33c of the cap and the pressure responsive actuator and inner spring abutment can move with the valve stem and member to a valve open position when fluid pressure is applied to the underside of the pressure responsive actuator through a fitting 50. The spring adjustment means is also adjustable to an actuator unload spacing between the first and second spring abutments in which the outer head 55 is in engagement with the outer abutment on the end wall of the cap and the first spring abutment 51 is out of engagement with the pressure responsive actuator 25, to relieve the spring reaction force on the cap and cap fastening means 30. The first spring abutment means 51 is arranged to disengage and separate from the pressure responsive actuator when the adjustment means is adjusted to the actuator unload spacing to enable removal of the spring and spring adjustment means with the actuator cap.

The spring adjustment means will unload valve closing force on the actuator when adjusted to a minimum unload position in which the head 55 is in engagement with the outer face of the cap end wall and the inner spring abutment 51 is out of engagement with the actuator 25, when the valve is in its closed position. However, there are applications in which it is desirable to allow the valve to open for flow through the valve on some failure in the system which supplies control fluid pressure to the underside of the pressure responsive actuator. The spring adjustment means is accordingly advantageously made adjustable to positions to which the first spring abutment means is out of engagement with the pressure responsive actuator until the valve member moves in response to the line pressure in the valve casing to positions spaced from the valve seat. When the spring adjustment means is adjusted to a position as shown in FIG. 2, the spring abutment 51 does not engage the pressure responsive actuator 25 until the valve member has moved from its closed position a distance sufficient to allow substantially full flow through the valve seat in response to the line pressure in the valve. As will be seen, the outer head 55 moves with the movable actuator 25 when the spring compressing means is adjusted to the actuator pre-load spacing so that head also provides a visual indication of the position of the valve member.

Figure 3:
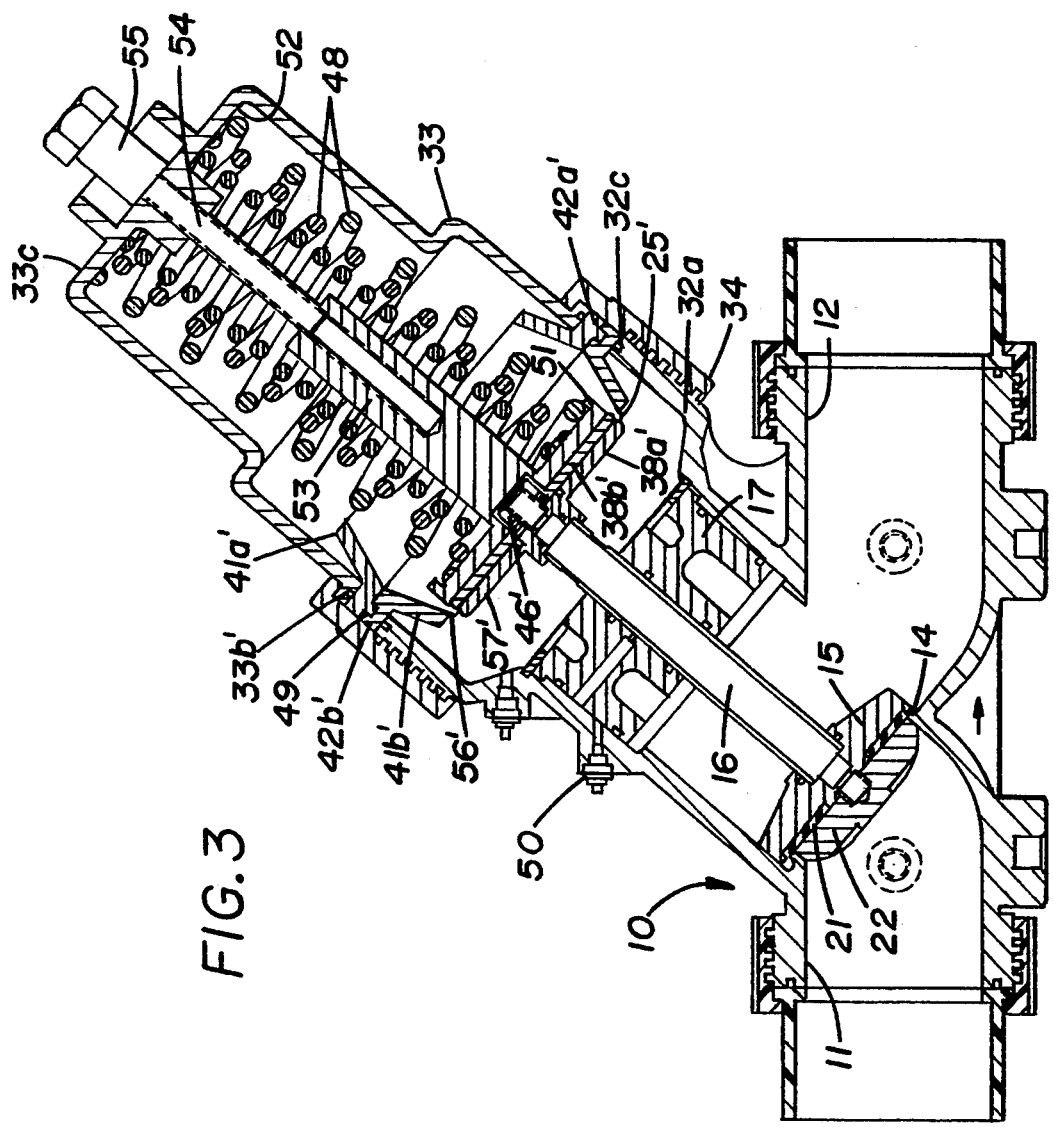
FIG. 3 is a sectional view through a second embodiment having a diaphragm type actuator.

The valve in the embodiment of FIG. 3 is similar to that illustrated in FIGS. 1 and 2 and like numerals are used to designate corresponding parts with modified parts indicated by the postscript '. In this embodiment, the pressure responsive actuator designated 25' is a flexible diaphragm and the stationary actuator wall means comprises first and second frusto-conical diaphragm retainer rings 41a' and 41b' each having flange portions 42a' 42b' respectively extending outwardly from a major end of the frusto conical wall portions. The actuator diaphragm 25' has an outer portion disposed between the flanges 42a' and 42b' and these flange portions are interposed between the end face 32c of the actuator base and the end face 33b of the actuator cap. As in the preceding embodiment, clamp ring 34 clamps the cap to the flanges on the diaphragm retainer rings and to the actuator base. A plurality of locating pins or projections 49 are provided on the flange portions 42a' and 42b' and extend through openings in the outer portion of the diaphragm and into pin receiving pockets in the flange portion of the other inner rings to aid in locating the retainer rings relative to each other and to hold the periphery of the diaphragm in position. For example, the rings 41a' and 41b' can each be formed with alternate projections 49 and projection receiving recesses at equal angular spacing so that the projections on each ring are receivable in the recesses in the other ring.

A central portion of the diaphragm 25' is attached to the valve stem for movement therewith and, as shown, diaphragm plate means 38a' and 38b' are disposed at opposite sides of a central portion of the diaphragm and each have an outer diameter slightly smaller than the minor end of the frusto-conical wall portions 41a' and 41b'. The diaphragm and diaphragm plates are secured to the valve stem as by a nut and washer assembly 46'.

The spring adjustment means in embodiment of FIG. 3 is the same as that shown in FIGS. 1 and 2 and like numerals are used to designate the same parts.

Figure 4:
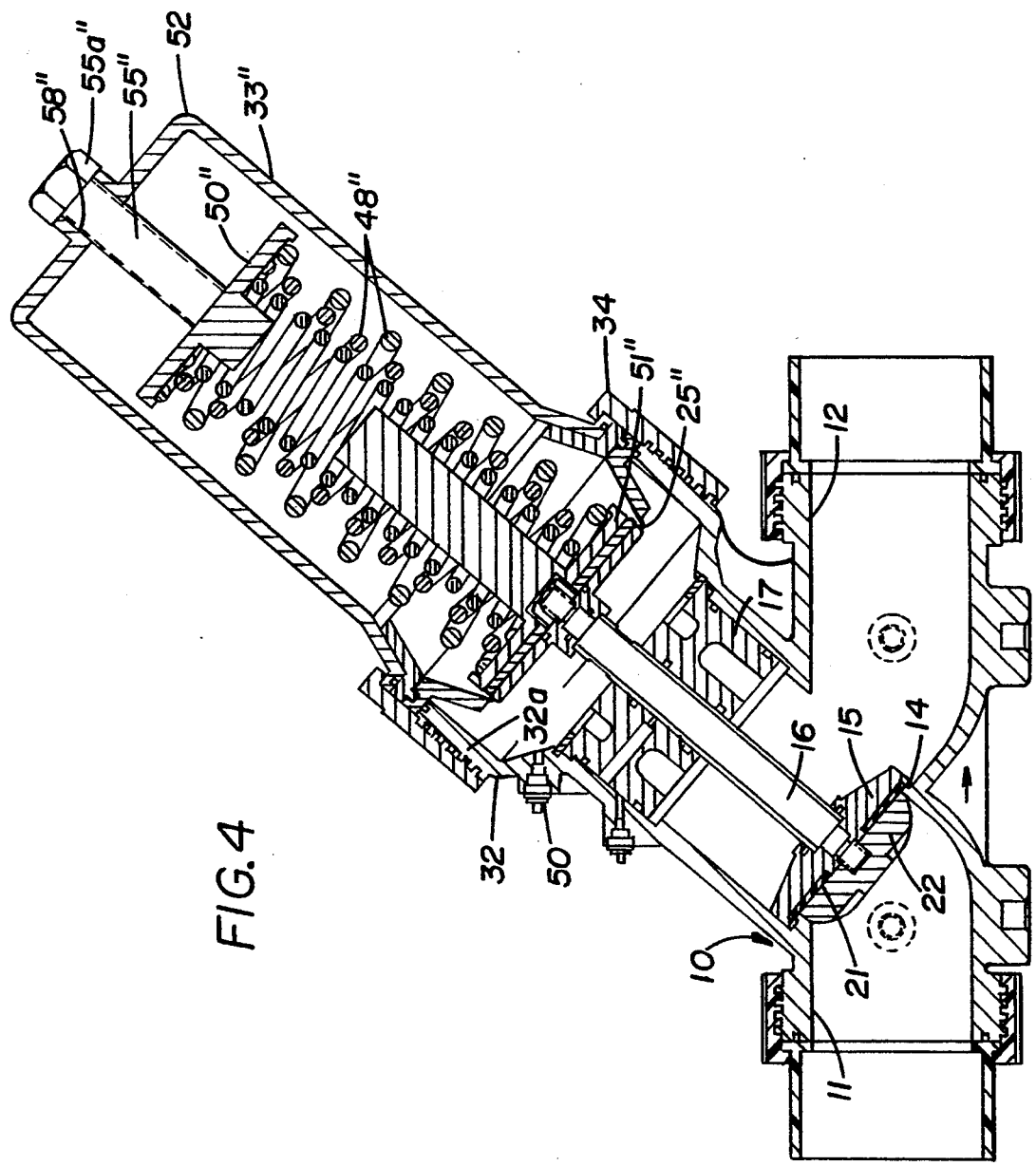
FIG. 4 is a sectional view through a further embodiment of the invention.

The valve of FIG. 4 is similar to that described in the preceding embodiments, and has a modified arrangement for adjusting the spring between an actuator unload condition and an actuator pre-load condition, and like numerals followed by the postscript " are used to designate modified parts. In this embodiment, a first spring abutment means 51" engages one end of the spring and is movable into and out of engagement with the pressure responsive actuator means 25". A second spring abutment means 50" engages the other end of the spring 48, and a screw means 55" is threadedly mounted in an opening 58" in the cap 33" for adjusting the position of the second spring abutment means 50". The cap 33" is made sufficiently tall so that, when the screw 55" is unthreaded to a position in which the second spring abutment 50" is at or adjacent the end wall 52" of the cap, the spring is spaced from the first spring abutment means 51" a distance at least substantially corresponding to the free length of the spring 48, to reduce the pre-load on the valve actuator to substantially zero and facilitate removal of the cap, actuator and spring from the base. The screw 55" has a means such as a head or key 55a" outside the cap for turning the screw to decrease the spacing of the second spring abutment means to a selected actuator pre-load spacing, in which the spring is in a partially compressed condition when the valve member is closed, to hold the valve member in a closed condition against the working pressure of the valve. In this embodiment, the spring adjustment means also enables the spring loading on the actuator 25" to be adjusted for different working pressures in the valve.

From the foregoing it is believed that the construction, operation and advantages of the invention will be readily understood. In the embodiments of FIGS. 1 and 3, the spring adjustment means is adjustable to compress the springs and disengage the spring abutment 51 from the pressure responsive actuator when the valve member is closed, to relieve the spring reaction force on the cap attaching ring 34 and facilitate removal of the cap, spring and spring compressing means from the actuator. The spring adjustment means is also adjustable to move the spring abutment 51 to positions to allow partial or full flow through the valve member, in the event of failure of the control pressure system. During normal operation, the head 55 on the spring adjustment means moves with the pressure responsive actuator and valve to provide a visual indication of the valve position. In the embodiment of FIG. 4, the spring adjustment means 55" and 33" are arranged so as to allow adjustment of the second spring abutment means 50" to a position in which a second spring abutment is spaced from the first spring abutment a distance substantially corresponding to the free length of the spring, to thereby unload the spring pressure on the actuator and facilitate removal of the cap and spring and actuator. The actuator housing construction in each of the embodiments facilitates assembly and disassembly of the cap and spring from the base and, further, provide for an even distribution of the forces and pressures that act between the cap and base.

We claim:

1. A fluid pressure actuated flow control valve comprising, valve casing means defining a flow passage having an inlet and an outlet and a valve seat intermediate the inlet and outlet, actuator base means fixed to the valve casing means, actuator cap means having an open end and an end wall spaced from the open end, said actuator base means including annular base wall means spaced outwardly from the stem and having external threads concentric with the stem and a base end face disposed in a plane perpendicular to the stem, the actuator cap means having annular cap wall means spaced outwardly from the stem and a cap flange extending outwardly from the cap wall means and a cap end face, an annular clamp ring means threadedly engaging the external threads on the base wall means and extending around said cap flange and having an inwardly extending flange portion engaging said cap flange on the cap means for detachably clamping the cap means to the base wall means, a valve member having a stem, movable pressure responsive actuator means attached to the valve stem for movement with the valve member between a valve closed position engaging the seat and a valve open position, coil type compression spring means disposed in the cap means coaxial with the stem, a first spring abutment means at a first end of the spring means, engageable with the actuator means for spring loading the actuator means toward a closed position and disengageable from the actuator means, a second spring abutment means engaging a second end of the spring means for transmitting spring reaction force to the actuator cap means, and spring adjustment means operable from outside the cap means for adjusting the axial spacing between the first and second spring abutment means to change the spring loading on the movable actuator means, the spring adjustment means being adjustable (a) to an actuator unload spacing between the first and second spring abutment means in which there is no spring loading on the actuator means when the valve member is in the closed position to facilitate assembly and disassembly of the cap means from the base means, and (b) to an actuator pre-load spacing between the first and second spring abutment means in which the spring loading on the actuator means when the valve member is closed is sufficient to hold the valve member seated against working pressure at the inlet side of the valve seat, said spring means having a preselected free length, the second spring abutment means being movable in said cap to an actuator unload spacing in which the second spring abutment means is spaced a distance corresponding to said preselected free length from the first spring abutment means, said spring adjustment means including a screw means threadedly mounted on said cap means and having an inner end engaging said second spring abutment means, and means on the screw means outside the cap for turning the screw means to decrease the spacing between the second spring abutment means and the first spring abutment means from said actuator unload spacing to a selected actuator pre-load spacing between the first and second spring abutment means.

2. A fluid pressure actuated valve according to claim 1 wherein the pressure responsive actuator means includes a diaphragm.

3. A fluid pressure actuated valve according to claim 1 including annular stationary actuator wall means comprising first and second diaphragm retainer rings each having a frusto-conical wall portion and a flange portion extending outwardly from a major end of the frusto-conical portion, said pressure responsive actuator means comprising a diaphragm having a central portion attached to the valve stem and an outer portion disposed between the major ends of the first and second diaphragm retainer rings.

4. A fluid pressure operated valve according to claim 3 including a plurality of locating pins on the flange portion of at least one of the retainer rings extending through openings in the diaphragm and into pin receiving pockets in the flange portion of the other of the retainer rings.

5. A fluid pressure operated valve according to claim 4 including an annular seal ring disposed in a recess in the base end face and an annular seal ring disposed in a recess in the cap end face.

6. A fluid pressure operated valve according to claim 5 including diaphragm plate means at opposite sides of the diaphragm each having an outer diameter smaller than the minor end of the frusto-conical wall portions.

7. A fluid pressure operated valve according to claim 3 wherein said first and second diaphragm retainer rings are of like shape and size, each of said retainer rings having at least two locating pins on the flange portion and at least two locating pin receiving pockets in the flange portion at locations such that the pins on the flange portions of one retainer ring extend into pin receiving pockets in the flange portion of the other retainer ring.

8. A fluid pressure operated flow control valve comprising, a valve casing defining a flow passage having an inlet and an outlet and a valve seat intermediate the inlet and outlet, a valve member having a valve stem and valve guide means on the valve casing slidably supporting the valve stem, an actuator base including annular base wall means spaced outwardly from the stem and having external threads and a base end face in a plane perpendicular to the stem, an actuator cap including annular cap wall means spaced outwardly from the stem and a cap end face, annular stationary actuator wall means having outwardly extending flange means disposed between the base end face and the cap end face, annular clamp ring means threadedly engaging the external threads on the base wall means and extending around said annular flange means and having an inwardly extending flange portion engaging said cap for clamping the cap to the base wall means, and movable actuator wall means attached to the valve stem and engaging said stationary actuator wall means, said stationary actuator wall means comprising first and second diaphragm retainer rings each having a frusto-conical wall portion and a flange portion extending outwardly from a major end thereof, said movable actuator wall means comprising a diaphragm having a central portion attached to the valve stem and an outer portion disposed between the major ends of the first and second diaphragm retainer rings.

9. A fluid pressure operated valve according to claim 8 including a plurality of locating pins on the flange portion of at least one of the retainer rings extending through openings in the diaphragm and into pin receiving pockets in the flange portion of the other of the retainer rings.

10. A fluid pressure operated valve according to claim 8 including an annular seal ring disposed in a recess in the base end face and an annular seal ring disposed in a recess in the cap end face.

11. A fluid pressure operated valve according to claim 8 including diaphragm plate means at opposite sides of the diaphragm each having an outer diameter smaller than the minor end of the frusto-conical wall portions.

12. A fluid pressure operated valve according to claim 8 wherein said first and second diaphragm retainer rings are of like shape and size, each of said retainer rings having at least two locating pins on the flange portion and at least two locating pin receiving pockets in the flange portion at locations such that the pins on the flange portions of one retainer ring extend into pin receiving pockets in the flange portion of the other retainer ring.

13. A fluid pressure actuated flow control valve comprising, valve casing means defining a fluid passage having an inlet and an outlet and a valve seat intermediate the inlet and outlet, actuator base means fixed to the valve casing means, actuator cap means having an open end and an end wall spaced from the open end, means detachably connecting the open end of the actuator cap means to the actuator base means, a valve member having a stem, movable pressure responsive actuator means attached to the valve stem for movement with the valve member between a valve closed position engaging the seat and a valve open position, coil type compression spring means disposed in the cap means coaxial with the stem and having a preselected overall length when fully expanded, a first spring abutment means at a first end of the spring means, said first spring abutment means being engageable with the actuator means for applying spring force thereto, a second spring abutment means engaging a second end of the spring means, the second spring abutment means being movable in said cap means to an actuator unload spacing in which the second spring abutment means is spaced a distance corresponding to said preselected overall length from the first spring abutment means when the valve member is closed and such that there is substantially no spring loading on the actuator means when the valve member is closed to facilitate assembly and disassembly of the cap means from the base means, spring adjustment means including a screw means threadedly mounted on said cap means and having an inner end engaging said second spring abutment means, the screw means being adjustable to decrease the spacing between the first and second abutment means from said actuator unload spacing to a selected actuator preload spacing between the first and second abutments means.

* * * * *